United States Patent [19]

Grois et al.

[11] Patent Number: 5,274,903
[45] Date of Patent: Jan. 4, 1994

[54] CRIMPING TOOL SYSTEM FOR OPTICAL FIBER CABLES

[75] Inventors: Igor Grois; Mark Margolin, both of Lincolnwood, Ill.

[73] Assignee: Molex Incorporated, Lisle, Ill.

[21] Appl. No.: 40,397

[22] Filed: Mar. 30, 1993

Related U.S. Application Data

[60] Continuation of Ser. No. 935,960, Aug. 26, 1992, abandoned, which is a division of Ser. No. 789,512, Nov. 8, 1991, abandoned.

[51] Int. Cl.$^5$ ............................................. B23P 23/00
[52] U.S. Cl. ........................................ 29/566; 29/270; 29/282
[58] Field of Search .................. 29/753, 758, 761, 508, 29/517, 282, 861, 862, 863, 868, 566, 270; 7/107, 125; 72/410, 416; 385/81, 84

[56] References Cited

U.S. PATENT DOCUMENTS

| | | | |
|---|---|---|---|
| 2,079,505 | 4/1937 | Hopkins | 81/426.5 |
| 2,819,634 | 1/1958 | Hansen | 72/410 |
| 3,175,281 | 3/1965 | Elfsten | 72/410 |
| 3,531,971 | 10/1970 | Robb et al. | 72/410 |
| 3,706,219 | 12/1972 | Hoffman et al. | 29/761 |
| 3,732,718 | 5/1973 | Barberio | 29/751 |
| 3,872,528 | 3/1975 | Porter | 72/410 |
| 4,229,849 | 10/1980 | Theiler | 7/107 |
| 4,679,895 | 7/1987 | Huber | 385/81 |
| 4,705,352 | 11/1987 | Margolin et al. | 385/81 |
| 4,715,251 | 12/1987 | Margolin | 29/854 |
| 5,096,276 | 3/1992 | Gerace et al. | 385/76 |
| 5,125,059 | 6/1992 | Wall | 385/81 |

*Primary Examiner*—Timothy V. Eley
*Attorney, Agent, or Firm*—A. A. Tirva

[57] ABSTRACT

A crimping tool system is provided for compressing a connector component onto an optical fiber cable, wherein the component includes an open end into which the cable is inserted. A tool includes a pair of jaws relatively movable toward and away from each other. Each jaw includes a first stage recessed surface area combining with the first stage recessed surface area of the other jaw to define a first stage crimping cavity sized to compress the cable sufficiently to ensure that the cable is insertable into the open end of the connector component. Each jaw includes a second stage recessed surface area combining with the second stage recessed surface area of the other jaw to define a second stage crimping cavity sized to compress the connector component onto the cable. The second stage recessed surface areas have protrusions for indenting the connector component and driving portions of the component against the cable. A rigid retention insert member surrounds the optical fiber of the cable to project the fiber, and the insert member is positionable inside an outer jacket of the cable to provide a rigid backing for the outer jacket when the connector component is crimped thereon.

6 Claims, 1 Drawing Sheet

CRIMPING TOOL SYSTEM FOR OPTICAL FIBER CABLES

This is a continuation of copending application Ser. No. 07/935,960, filed on Aug. 26, 1992 now abandoned which is a divisional of copending application Ser. No. 07/789,512 filed on Nov. 8, 1991 now abandoned.

FIELD OF THE INVENTION

This invention generally relates to the art of application tooling for optical fiber connectors and, particularly, to a crimping tool for compressing a connector component onto an optical fiber cable.

BACKGROUND OF THE INVENTION

There are many application tools, presses and the like for terminating a wide variety of electrical connectors to terminals, cables, wires and the like. One type of application tooling involves compression tools for crimping metal components about electrical or signal conductors or coaxial cables to form a structural or mechanical connection therebetween.

Many types of connector assemblies commonly have cylindrical components which are crimped onto the exterior of an insulated electrical wire or cable having a central conductor. The component often is fabricated of stamped and formed sheet metal material which retains its crimped configuration onto the insulated wire or cable.

One of the problems with use of terminating connections of the character described above with optical fiber cables is that crimping may damage the optical fiber and thus decrease its transmitting capabilities.

Another problem involves the interconnection of a cable, for instance, wherein an outer insulating jacket is cut back to expose the optical fiber. A connector component, such as a rear shell, is crimped onto the outer jacket, while the core terminates to various components within the shell. Often, it is difficult to insert the jacket into the shell because of close tolerances between the inside diameter of the shell and the outside diameter of the jacket. The jacket may not be truly round, or otherwise out of shape; and the jacket must be shaped or crimped before it can be inserted into the shell. Most often, a plurality of tools are utilized, including one tool to facilitate insertion of the cable into the shell, and another tool to crimp the shell onto the outside of the cable.

This invention is directed to providing a crimping tool of the character described to solve the above problems and satisfy a need for an improved multi-function crimping tool.

SUMMARY OF THE INVENTION

An object, therefore, of the invention is to provide a new and improved crimping tool for compressing a connector component onto an optical fiber cable, and to facilitate insertion of the cable into the connector component.

In the exemplary embodiment of the invention, the crimping tool includes a pair of jaws relatively movable toward and away from each other. Each jaw includes a recessed surface area combining with the recessed surface area of the other jaw to define a crimping cavity therebetween. Each recessed surface area includes a protrusion for indenting the connector component and driving portions of the component against the cable when the jaws are moved toward each other to compress the component.

More particularly, the recessed surface areas in the jaws are polygonal, such as three-sides to define a hexagonal crimping cavity. The protrusions are located on diametrical opposite sides of the cavity. As disclosed herein, each jaw forms a body having the respective recessed area therein, and the protrusions comprise pins insert-mounted in the respective body.

The crimping tool is disclosed herein for particular application to assembling an optical fiber cable to a connector assembly which includes a generally cylindrical rear shell. The shell includes an open end into which the cable is inserted, including a stripped-back distal end of an outer jacket of the cable. A rigid insert member is positioned about the unsheathed optical fiber of the cable to protect the fiber, and the insert member extends into the outer jacket within the crimping area of the rear shell. Therefore, when the rear shell is crimped onto the outer jacket of the cable, the jacket is sandwiched between the rear shell and the insert member, and the rigid insert member protects or isolates the optical fiber from any crimping forces.

Whereas the cavity of the tool providing the above-described protrusions can be considered a second stage crimping area of the tool, each jaw includes a first stage recessed surface area combining with the first stage recessed surface area of the other jaw to define a first stage crimping cavity sized to compress the insulated conductor sufficiently in ensure that the insulated conductor is insertable into the open end of the rear shell. Both the first and second stage crimping cavities are provided in the jaws of a single tool to both facilitate insertion of the cable into the rear shell and then to crimp the shell onto the cable.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
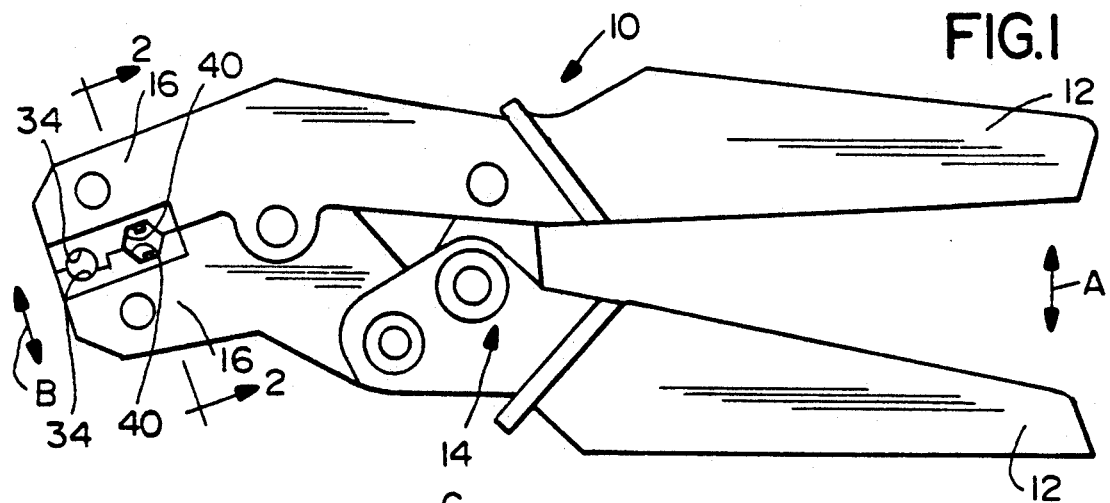
FIG. 1 is a side elevational view of a hand-held crimping tool embodying the concepts of the invention, with the jaws of the in closed condition.

Referring to the drawings in greater detail, and first to FIG. 1, a crimping tool, generally designated 10, is illustrated and embodies the concepts of the invention. The crimping tool is illustrated in the form of a hand-held, pliers-type tool as might be found for field use in optical fiber cable assembly applications. Of course, it should be understood that the basic principles of the invention are equally applicable for other types of tools, presses and the like.

Generally, crimping tool 10 includes a pair of hand-grippable handles 12 interconnected intermediate their ends by a common toggle-type pivoting connection, generally designated 14. The handles terminate in opposite distal ends 16 defining jaws on the opposite side of toggle connection 14. As with any such tool, handles 12 are movable in the direction of double-headed arrow "A" to move jaws 16 in the direction of double-headed arrow "B", in view of the crimping tool being shown in its closed condition in FIG. 1. With any such pliers-type tool, moving handles 12 toward each other opposite the direction of double-headed arrow "A", will close jaws 16 toward each other opposite the direction of double-headed arrow "B", in order to effect crimping functions of the tool.

Figure 2:
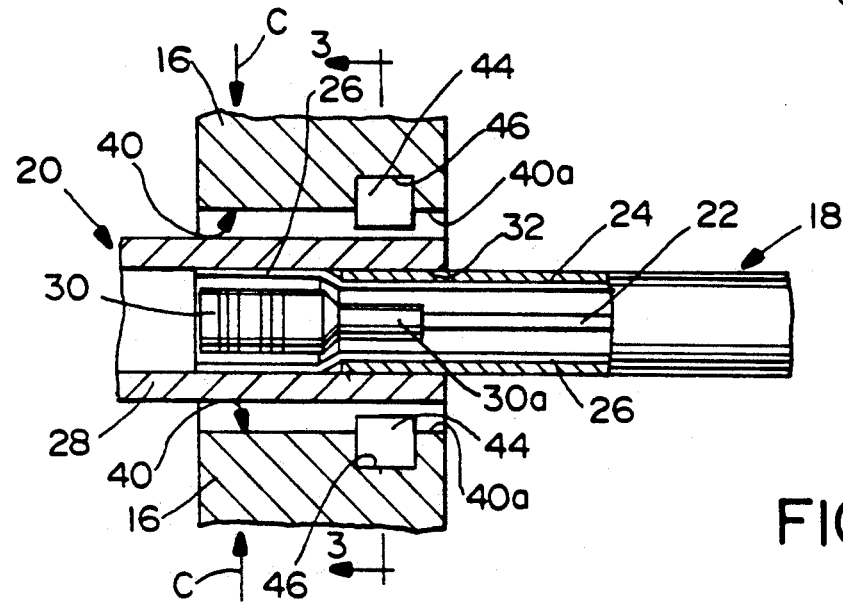
FIG. 2 is a fragmented, generally vertical section, on an enlarged scale, taken generally along line 2—2 of FIG. 1, with the jaws in open condition and with an optical fiber cable/connector assembly disposed between the jaws.

Before proceeding with a detailed description of crimping tool 10, reference is made to FIG. 2 wherein an optical fiber cable/connector assembly is shown disposed between jaws 16. Specifically, an optical fiber cable, generally designated 18, is intended to be terminated in a connector assembly, generally designated 20. Cable 18 includes an optical fiber 22 and an outer insulating jacket 24, with strain relief or strength means 26 therebetween. The strength means may take various forms, such as Kevlar strands, or the like. Connector assembly 20 includes a connector component in the form of a generally cylindrical, tubular rear shell 28. A retention insert member 30 surrounds core 22 and extends into outer jacket 24 for purposes described hereinafter.

In assembly, it is intended for outer jacket 24 of cable 18 to be stripped back a given degree to expose distal ends of fiber 22 and strength strands 26. The exposed fiber is inserted through retention insert 30, strength strands 26 are located on the outside of the retention insert, and outer jacket 24 is inserted into an open end 32 of rear shell 28. This relative condition of the optical fiber cable, rear shell and retention insert member is shown in FIG. 2. Tool 10 then is used to crimp rear shell 28 onto outer jacket 24 in the area of a reduced-diameter portion 30a of retention insert 30 which, in turn, also clamps strength strands 26 against the reduced-diameter portion of the retention insert. The retention insert is fabricated of rigid material to isolate the delicate fiber 22 of cable 18 and to protect the fiber against any crimping or compressive forces. The outer jacket 24 and strength strands 26 of the cable are sandwiched between the reduced diameter portion 30a of the rigid retention insert upon crimping.

However, before crimping rear shell 28 onto the cable 18, it often is difficult to insert the cable (i.e. outer jacket 24) into open end 32 of the rear shell. The cable may have become somewhat flattened for various reasons, or tolerance problems may occur between the outside diameter of the outer jacket and the inside diameter of the rear shell, particularly at open end 32 of the shell.

In view of the problem described above, and referring back to FIG. 1 each jaw 16 of the tool is provided with a first stage recessed surface area 34 which combines with the first stage recessed surface area 34 of the other jaw to define a first stage crimping cavity therebetween. When the jaws are in their closed condition as shown in FIG. 1, the first stage crimping cavity, defined by recessed surface areas 34, is sized to compress outer jacket 24 of the cable 18 sufficiently to ensure that the cable is insertable into open end 32 of the rear shell. In other words, the diameter of the first stage crimping cavity defined by recess surface areas 34 is slightly smaller than the inside diameter of rear shell 20 and its open end 32. The first stage crimping cavity will compress the outer jacket and/or configure the jacket into a configuration for insertion into the open end of the rear shell.

Although the first stage crimping cavity defined by recessed surface areas 38 in jaws 16 is shown to be of a round configuration for crimping onto a round, jacketed cable, it should be understood that this configuration is not intended to be limiting of the invention.

Once outer jacket 24 of the cable 18 has been crimped to a size sufficient for insertion into open end 32 of rear shell 28, and the cable is then inserted into the rear shell and the other components of the cable operatively assembled in and about retention insert 30, as shown in FIG. 2, the cable is inserted into the jaws for a second stage operation of crimping the rear shell onto the cable.

More particularly, each jaw 16 includes a second stage recessed surface area, generally designated 40, which combines with the second stage recess surface area 40 of the other jaw to define a second stage crimping cavity for crimping rear shell 28 onto the outer jacket 24 of the cable 18.

Figure 3:
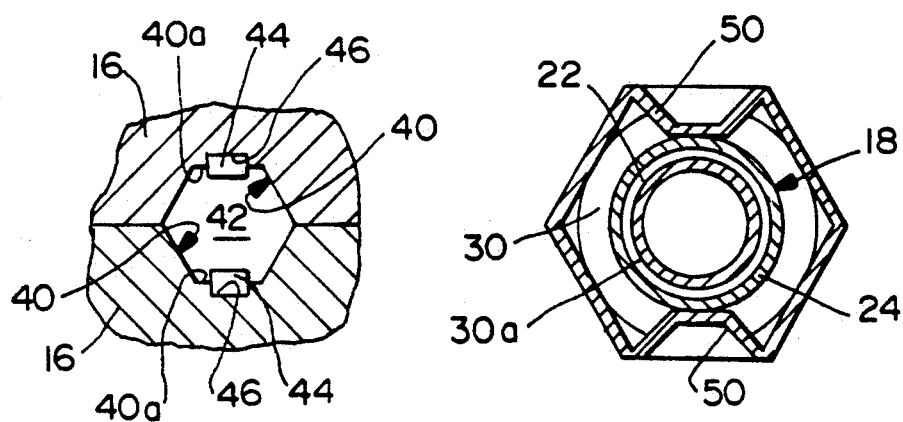
FIG. 3 is a vertical section taken generally along line 3—3 of FIG. 2, with the optical fiber cable/connector assembly removed to facilitate the illustration.

Referring to FIGS. 2 and 3, each second stage recessed surface area 40 is polygonal to define a polygonal cavity 42 (FIG. 3). In the disclosed embodiment, each recessed surface area 40 is three-sided to define a hexagonal crimping cavity 42. This configuration defines opposite flat interior sides 40a oppositely facing each other diametrically across the cavity.

Generally, the invention contemplates that second stage recessed surface area 40 be provided with a protrusion 44 extending into second stage crimping cavity 42 for indenting rear shell 28 and driving a portion of the rear shell against outer jacket 24 of the cable 18. Specifically, each protrusion 44 is provided by a pin which is insert-mounted within a hole 46 in each jaw 16. Therefore, the jaws define bodies into which the pins can be pressfit, for instance. Again referring to FIG. 3, it can be seen that pins 44 are insert-mounted in holes 46 in opposite sides 40a of recessed surface areas 40.

Figure 4:
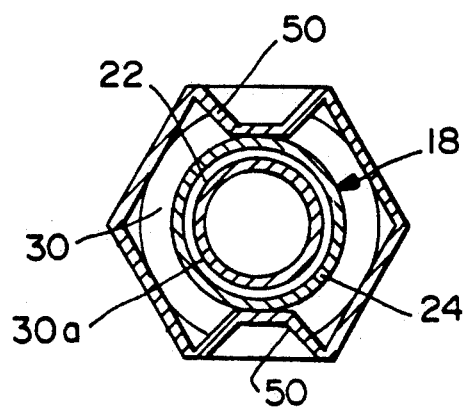
FIG. 4 is a cross-section through the optical fiber cable/connector assembly with the shell of the connector crimped onto the outer jacket of the cable.

In operation, and referring to FIG. 4 in conjunction with FIG. 2, assembled cable 18, rear shell 28 and retention insert 30 are inserted into second stage crimping cavity 42 so that pins 44 are in alignment with reduced-diameter portion 30a of the retention insert. The tool is operated to close jaws 16 in the direction of arrows "C" (FIG. 2) to drive pins 44 into rear shell 28 and deform the shell, as at 50 in FIG. 4. The deformed portions of the shell are driven into gripping engagement with outer jacket 24 of the cable 18. Strength strands 26 have been omitted from FIG. 4 to facilitate the illustration. The deformed portions 50 of rear shell 28 provide a more positive gripping action onto the cable than a more uniform closing or crimping of the shell substantially about the entire periphery thereof. This crimping action is made possible by the retention member 30 which protects the fiber 22 from the localized forces developed by the deformations of portion 50.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An optical fiber cable termination system for compressing a connector component onto an optical fiber cable which includes an outer jacket and an inner fiber comprising:

a rigid retention insert member insertable inside the outer jacket and surrounding the inner fiber of the cable to provide a backing for the jacket and to protect the fiber from compression forces;

a crimping tool including a pair of jaws relatively moveable toward and away from each other for crimping the connector component onto the outer jacket of the cable with the outer jacket sandwiched between the connector component and the rigid retention insert member, and with the inner fiber protected inside the insert member; and wherein said optical fiber cable includes strength means between the outer jacket and the inner fiber thereof, said rigid retention insert member including a first diameter portion about which said strength means are positionable and a reduced diameter distal end about which the strength means and a cut-back portion of the cuter jacket are positionable.

2. An optical fiber termination system as set forth in claim 1, wherein each jaw including a recessed surface area combining with the recessed surface area of the other jaw to define a crimping cavity between the jaws for crimping the component and clamping the strength means between the component and the first diameter portion of the retention insert member, and each recessed surface area including a protrusion for indenting the connector component and driving a portion of the component against the outer jacket when the jaws are moved toward each other to compress the component.

3. An optical fiber termination system as set forth in claim 2 wherein said recessed surface areas are three-sided to define a hexagonal crimping cavity, and said protrusions are located on diametrical opposite sides thereof.

4. An optical fiber termination system as set forth in claim 2 wherein each jaw includes a body having said recessed surface area therein, and said protrusions comprise pins insert-mounted in the respective body.

5. An optical fiber termination system as set forth in claim 2 wherein said protrusions are located in the respective recessed surface areas to be on diametrical opposite sides of the crimping cavity.

6. An optical fiber termination system as set forth in claim 2, wherein each jaw includes a second recessed area to define a second crimping cavity between the jaws said second cavity sized to compress the cable sufficiently to ensure that it is insertable into the connector component.

* * * * *